(12) United States Patent
Barton et al.

(10) Patent No.: US 6,754,006 B2
(45) Date of Patent: Jun. 22, 2004

(54) HYBRID METALLIC-DIELECTRIC GRATING

(75) Inventors: Ian Michael Barton, San Diego, CA (US); Steve Mathew Herman, Carlsbad, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/247,024

(22) Filed: Sep. 19, 2002

(65) Prior Publication Data

US 2003/0067687 A1 Apr. 10, 2003

Related U.S. Application Data

(60) Provisional application No. 60/327,519, filed on Oct. 5, 2001.

(51) Int. Cl.[7] .................................................. G02B 5/18
(52) U.S. Cl. ..................... 359/569; 359/572; 359/576; 359/584; 359/585; 359/589
(58) Field of Search .................................. 359/569, 572, 359/576, 580, 584, 585, 587, 589

(56) References Cited

U.S. PATENT DOCUMENTS 4,313,648 A  *  2/1982  Yano et al. .................. 359/587

* cited by examiner

*Primary Examiner*—Drew Dunn
*Assistant Examiner*—Fayez Assaf
(74) *Attorney, Agent, or Firm*—John P. Wooldridge

(57) ABSTRACT

A diffraction grating includes a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

24 Claims, 7 Drawing Sheets

HYBRID METALLIC-DIELECTRIC GRATING

This application claims the benefit of provisional application No. 60/327,519 filed on Oct. 5, 2001.

BACKGROUND OF THE INVENTION

1. Field of the Invention

The present invention relates to the field of chromatic separation, where a single light beam that is composed of many colors is separated into individual beams of different colors. More specifically, the invention relates to diffraction gratings used as chromatic separation devices.

2. Description of Related Art

The amount of data that can be transferred using an optical fiber is based on the bandwidth that the fiber can support. This value can be very large for modern fibers, leading to a theoretical limit of >10 Tbits/s for a single fiber cable link. However, in practice this bandwidth cannot be fully utilized, primarily due to electronic limitations in the generation and reception of laser beams modulated at this very fast rate. Wavelength division multiplexing (WDM) is a way to utilize more of the available bandwidth in an optical fiber by sending multiple individual channels, with different wavelengths, down a single fiber. The achievable data rate is now dependent on the number of channels multiplied by the data rate in each channel, which contains data at a rate able to be processed by modern electronics. WDM and DWDM systems have been deployed extensively for long-haul telecommunications links and are now being installed in shorter-range links such as metropolitan areas.

One of the key components for DWDM systems is a device which allows multiple beams of light, each having a slightly different wavelength corresponding to a communication channel, which are co-propagating in a single-mode optical fiber, to be separated spatially so that the information in each channel can be processed. Also, the reverse of this is needed, whereby individual channels having different wavelengths are recombined from individual fiber optic cables into a single cable. Gratings are commonly used to perform this spatial separation, by acting as chromatic dispersion elements. Existing DWDM components couple light out of fiber optic cable and back into different cable(s) a set distance away, striking a diffraction grating in the middle in order to provide separation or combination of the different colors that make up the data channels.

U.S. Pat. No. 4,111,524, titled "Wavelength Division Multiplexer", issued Sep. 5, 1978, teaches the use of a diffraction grating within a low loss multiplexing system. There are issues with using diffraction gratings for this purpose in that light passing through standard fiber optic cable becomes randomly polarized after traveling relatively short distances through the fiber. Unpolarized light is a problem for diffraction gratings with a pitch that is close to the wavelength of light, since the efficiency of the polarization states cannot be matched without significant losses using standard lamellar or sinusoidal single-layer groove structures. A grating with a pitch that is similar to the wavelength size allows the maximum dispersion of light incident on it, and so is desirable for the separation of high channel density DWDM.

The desire to increase the transferred data rate of DWDM systems has caused an increase in the total bandwidth that the channels take up. This is also a problem for grating-based demultiplexers/multiplexers, since the grating is required to have high performance (low loss) over a wide wavelength range. Conventional gratings typically have a small bandwidth region of optimum performance.

There is prior art concerned with finding methods to control polarization losses in grating based systems. One example is U.S. Pat. No. 6,097,863, titled "Diffraction Grating with Reduced Polarization Sensitivity" issued Aug. 1, 2000. The desire for improvement in gratings is not limited to telecommunications, several inventors have produced relevant advances in gratings for use in other fields, e.g., high-power lasers, such as U.S. Pat. No. 4,313,648, titled "Patterned Multi-Layer Structure And Manufacturing Method" and U.S. Pat. No. 5,907,436, titled "Multilayer Dielectric Diffraction Gratings" which involve the use of dielectric multilayer grating structures.

SUMMARY OF THE INVENTION

This invention has applications in spectroscopy, short-pulse lasers and optical telecom, among others. The invention details a new type of diffraction grating that has improved properties for chromatic dispersion, notably for dealing with a system with large chromatic dispersion involving unpolarized light.

The chromatic dispersion properties of a grating can be used to separate individual channels of a DWDM system by causing each channel to be diffracted at a different angle. This process causes a spatial separation of the channels at a later image plane, so that each can be coupled into a different fiber optic. These systems can also be used in reverse, where the light from individual channels are combined into one fiber by using the chromatic dispersion properties of a grating to re-direct each channel by a predetermined amount. Gratings have many advantages over other methods in that since they use an angular separation, they can be directly scaled for increasing channel number and decreasing channel spacing systems by changing the position of the output plane.

However the light for each channel in a DWDM system is not polarized. Conventional gratings with a wavelength-scale period are normally very polarization sensitive, having very different diffraction efficiencies for different polarizations. Their use requires a trade-off between total loss and polarization dependent loss of the system, i.e., the total diffraction efficiency is normally reduced for a solution in which the efficiency of each polarization of the incoming light is matched. Also, diffraction gratings for modern telecommunications are required to operate on many channels over a ~35 nm bandwidth with uniform performance. This is also an issue for conventional gratings, since performance is typically a strong function of bandwidth, and like the polarization case, the overall performance is diminished.

Dielectric gratings, with a period of similar size to the wavelength of the incident light, can be designed so that light is diffracted with near 100% efficiency for a specific wavelength and polarization. However, these types of gratings cannot produce this performance for an unpolarized beam over a range of incident wavelengths and angles. Larger-period gratings, such as mechanically ruled blazed gratings, operate in a totally different diffraction regime, and so are polarization independent devices. Also, the reflective properties of the metallic surface gives them high diffraction efficiency for a large wavelength range. However, the smaller the grating period, the higher the angular separation for each channel, so larger-period gratings are not as effective for channel separation, leading to larger, less stable, devices.

Using a hybrid structure, consisting of a base metallic reflecting layer with a diffraction grating on its surface that is formed from multilayer dielectric stacks, allows for the polarization insensitive reflective properties of the base metallic layer to operate in conjunction with the polarization sensitive diffraction properties of the multilayer grating structure so that a grating can be produced that has near 100% diffraction efficiency over a reasonable wavelength bandwidth, independent of the polarization of the incident beam.

DETAILED DESCRIPTION OF THE INVENTION

Figure 1:
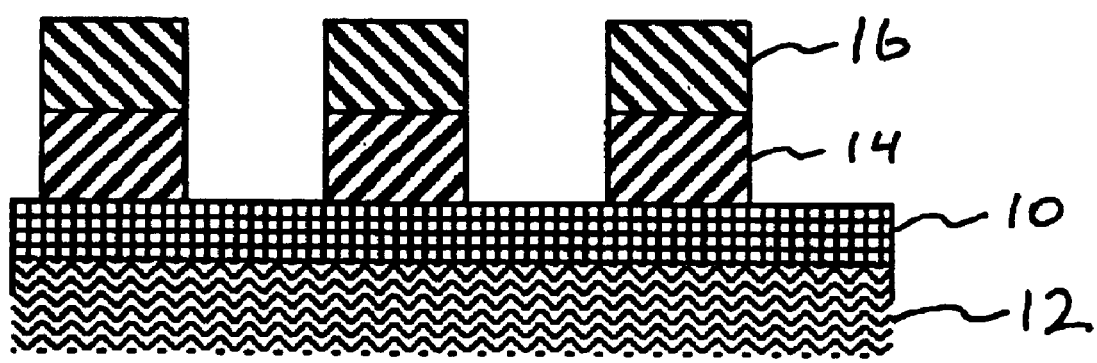
FIG. 1 shows an embodiment of a hybrid grating structure according to the present invention.

The invention consists of a diffraction grating composed of multilayer dielectric stacks on top of a metallic reflective surface as shown in FIG. 1. In one embodiment, a metallic layer 10 is deposited onto a substrate 12. A first dielectric layer 14 is deposited onto the metallic layer 10, and a second dielectric layer 16 is deposited onto the first dielectric layer 14. Dielectric layer 14 comprises a different index of refraction than dielectric layer 16 such that one dielectric layer has a relatively high index of refraction compared to the other. The alternating layer 14 and 16 could be repeated vertically as desired for a particular design. Alternate configurations for making multilayer stacks are known in the art and are considered to be within the scope of the present invention. Open spaces are periodically located between the multilayer dielectric stacks such the metallic layer 10 is not covered.

Figure 2A:
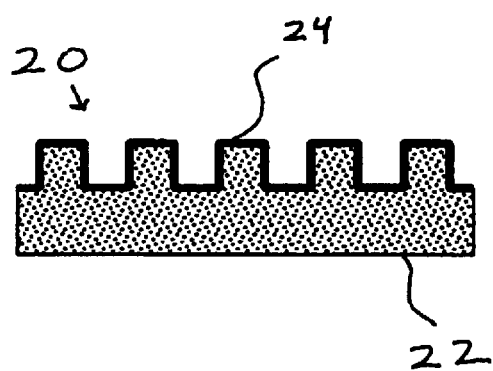
FIGS. 2A and 2B show conventional diffraction gratings.
Figure 2B:
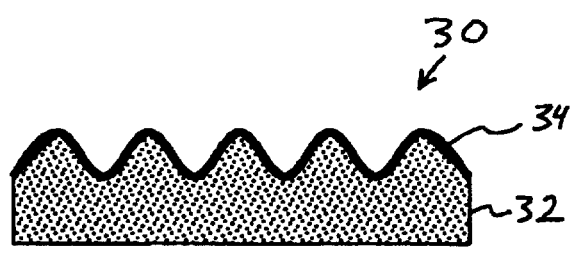

Two conventional grating designs are shown in FIGS. 2A and 2B. FIG. 2A shows a prior art grating 20 having Lamellar grooves that usually are etched into a monolithic substrate 22 and coated with a thin reflective metallic coating 24. FIG. 2B shows a prior art grating 30 having sinusoidal grooves that usually are formed in thin polymer layer 32 and coated with a thin reflective metallic coating 34.

The elements of the invention are:

1. Substantially identical stacks of alternating or periodically-spaced dielectric materials, each having different values for refractive index for the wavelength of use, periodically spaced on top of a uniform metallic reflecting base layer, so that the base layer is exposed in regions where there is no dielectric stack. (The stacks can be composed from layers that are approximately quarter-wave or half-wave optical thickness for a particular incident or reflection angle and be of different dielectric materials.). Each groove acts together with the other grooves to produce the same effect, hence identical grooves are desired. However, some change is allowed without destroying the gratings properties.

2. A uniform reflecting metallic base layer. This could be a thin metallic coating on top of a polished substrate, or the polished surface of a metal blank.

A grating of this type has only one diffraction order and a non-diffracting order (corresponding to a standard reflection). The grooves have two purposes. They should be of correct height or optical path distance to give high diffraction efficiency into the diffraction order for the known groove separation and wavelength of operation. They should filter light from propagating at an angle corresponding to the unwanted diffraction orders, hence an angle corresponding to one of the Bragg planes. The base material could be any highly reflecting smooth surface at the wavelength and angle of use. The reflection properties should be insensitive to the polarization of the incident beam.

The design of a particular grating according to the present invention includes the following criteria. A grating of this type has only one diffraction order and a non-diffracting order (corresponding to a standard reflection). The grooves have two purposes. They should be of correct height or optical path distance to give high diffraction efficiency into the diffraction order for the known groove separation and wavelength of operation. They should filter light from propagating at an angle corresponding to the unwanted diffraction orders, hence an angle corresponding to one of the Bragg planes. The base material could be any highly reflecting smooth surface at the wavelength and angle of use. The reflection properties should be insensitive to the polarization of the incident beam.

Figure 3:
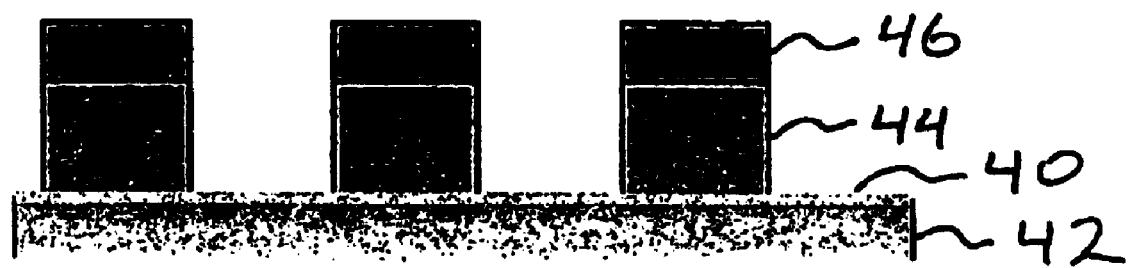
FIG. 3 shows a hybrid grating design that provides high performance (low losses) for light with properties matching those of telecommunications systems.

FIG. 3 shows a grating according to the present invention that has high diffraction efficiency over a reasonable wavelength bandwidth, independent of the polarization of the incident beam. This embodiment is one example and should not be considered as limiting. A 200 nm gold layer 40 is deposited onto a flat, polished substrate 42 that has a low coefficient of thermal expansion. A 690 nm silica layer 44 is deposited onto the 200 nm gold layer 40. A 310 nm silicon layer 46 is deposited onto the 690 nm silica layer 44. The alternating layer 44 and 46 could be repeated vertically as desired for a particular design. This embodiment has a period of 1.2 $\mu$m and a duty cycle of 0.45:1.

The grating is designed to operate with an incident angle of 40–42°, over a wavelength range corresponding to ~100 channels at 50 GHz spacing. The angular divergence of this grating is ~1.07 radians per micron of wavelength. The performance over the wavelength band, and its tolerance to fabrication and alignment error is shown in FIGS. 4–7.

Figure 4:
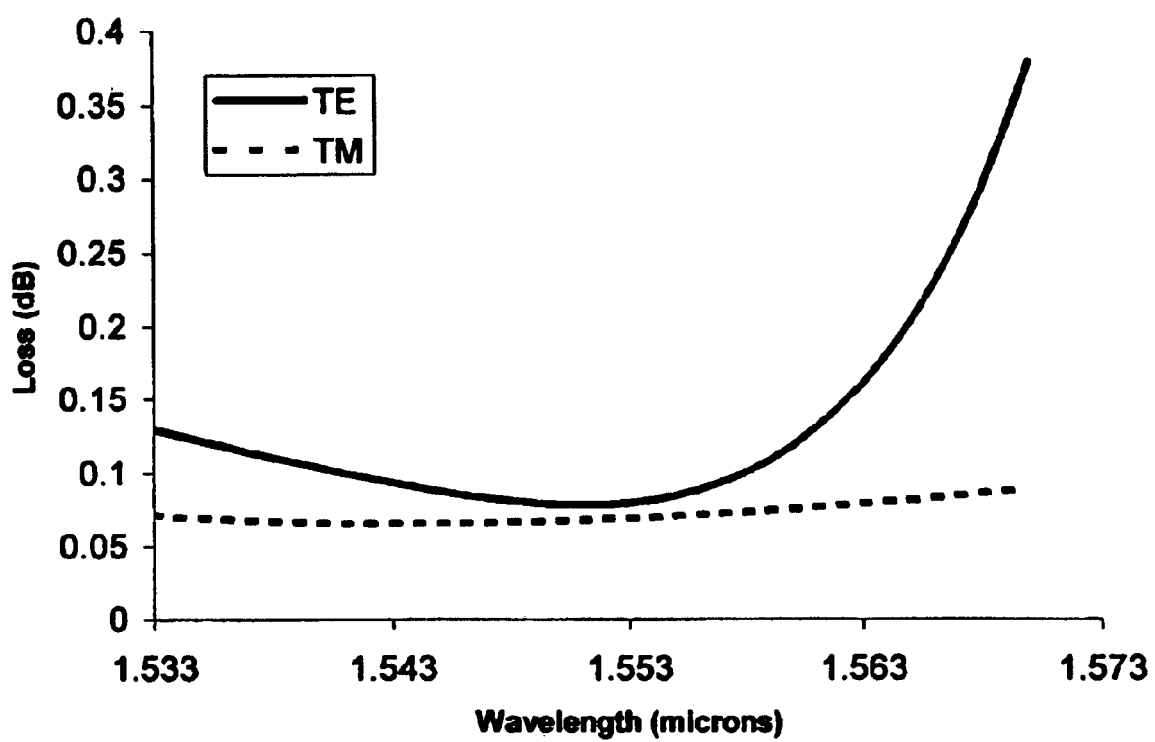
FIG. 4 details the loss of the grating over a bandwidth of 35 nm for both TE and TM polarization states.
Figure 5:
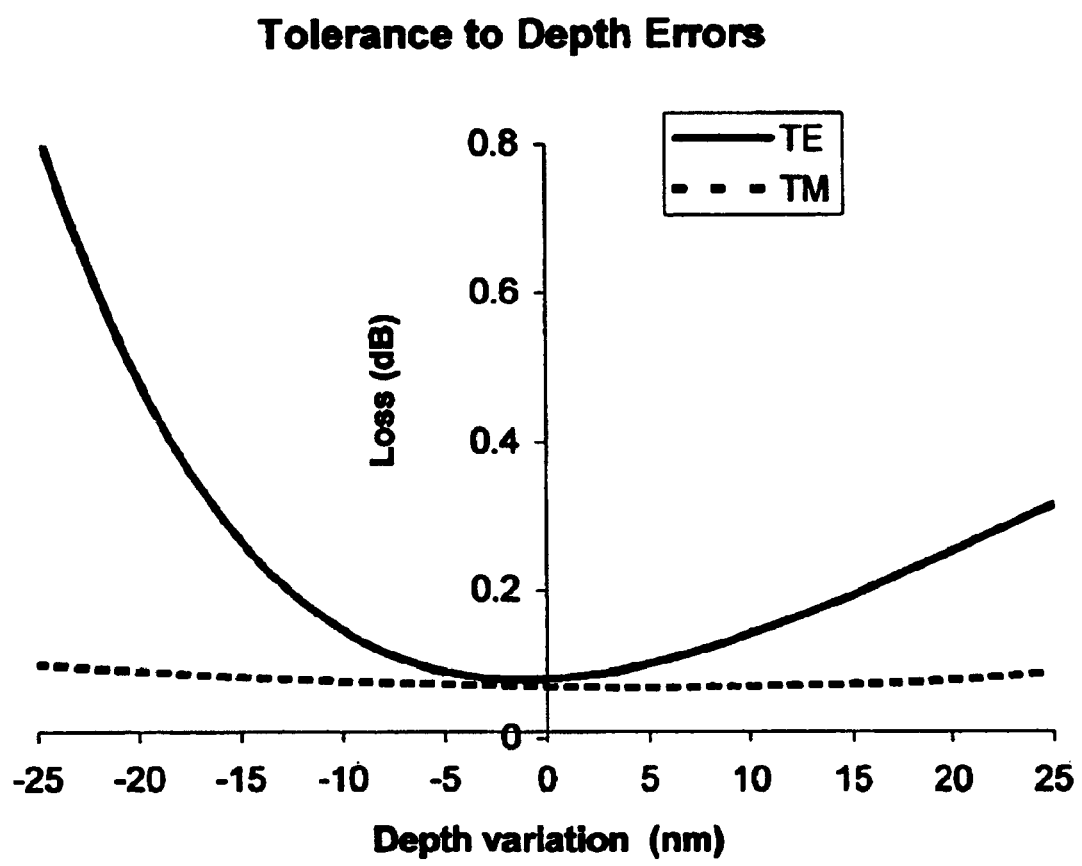
FIG. 5 demonstrates the tolerance of the grating design to depth errors.
Figure 6:
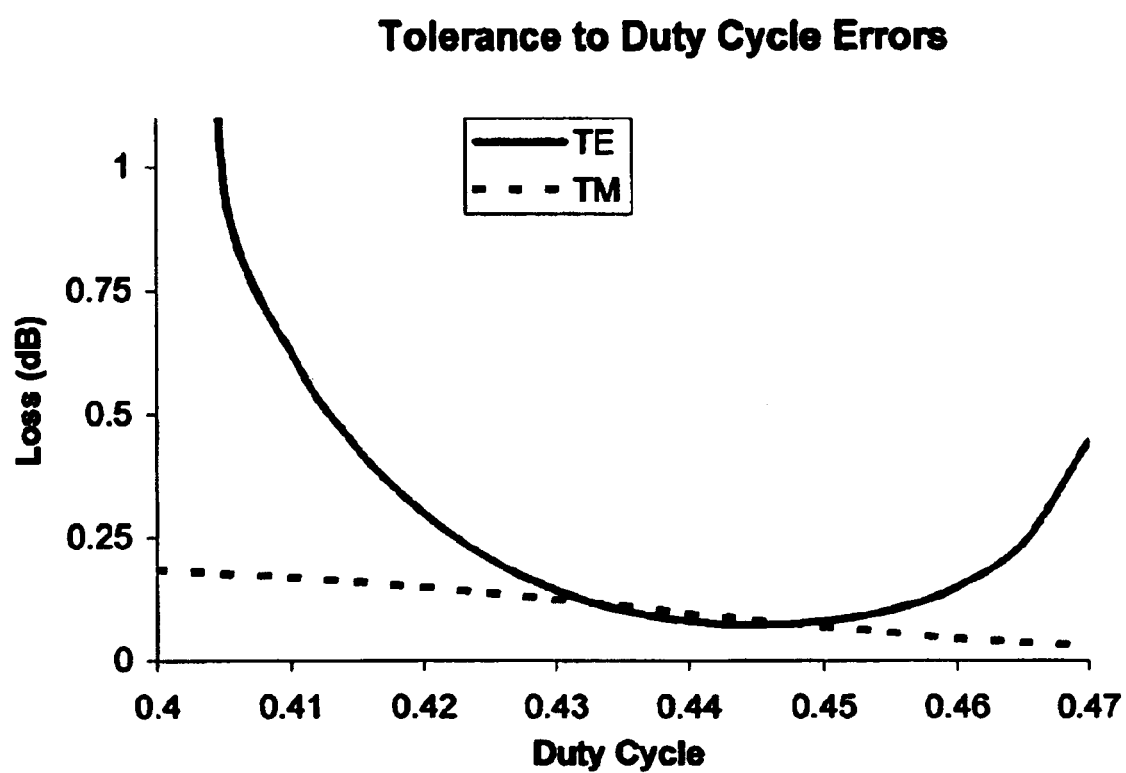
FIG. 6 shows the tolerance of the grating design to duty cycle errors.
Figure 7:
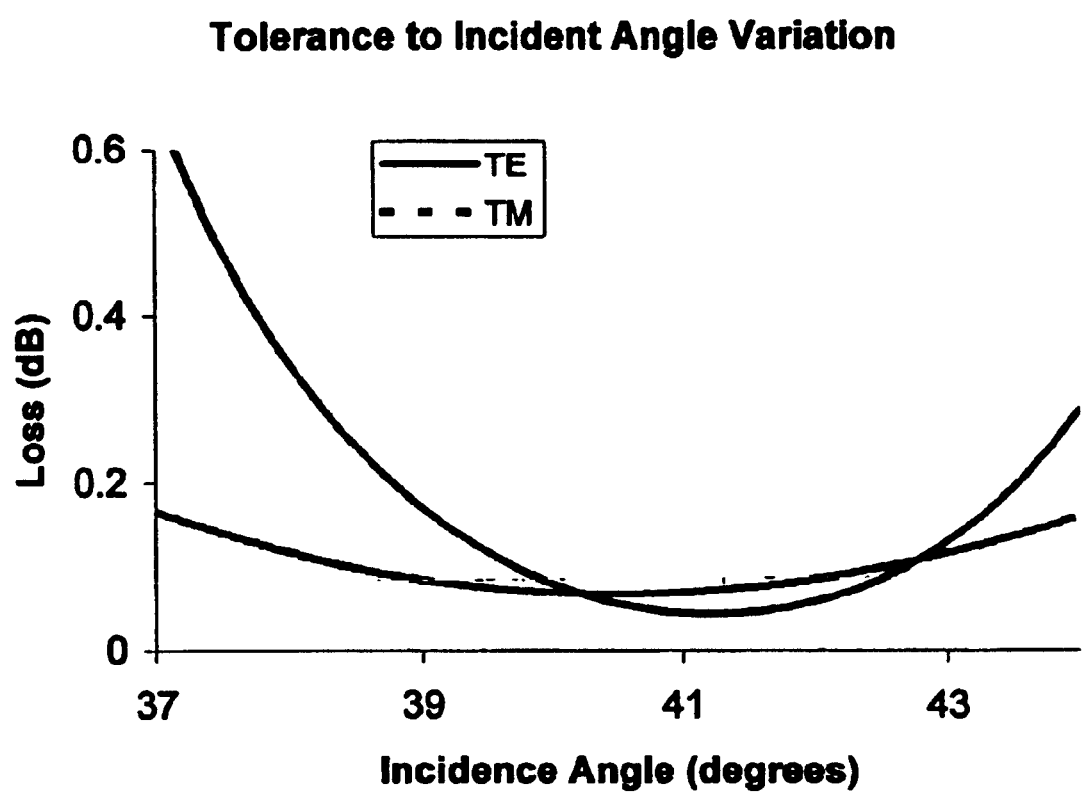
FIG. 7 shows the tolerance of the grating design to incident angle variation.

FIG. 4 details the loss of the grating over a bandwidth of 35 nm (approximately equal to that of the ITU grid size corresponding to the usable gain bandwidth of Erbium-doped fiber amplifiers) and both TE and TM polarization states. The maximum loss is less than 0.4 dB in all cases, with the majority of the light experiencing less than 0.2 dB of loss. This compares well to conventional blazed gratings that can achieve ~1 dB of loss over the same incident light parameters. FIGS. 5, 6 and 7 demonstrate the tolerance of the grating design to various fabrication-induced errors. They show that the design operates well within a loose set of fabrication tolerances compared to what is capable with current fabrication techniques.

Another consideration to determine the usefulness of the invention is its ability to be fabricated. As already discussed, the design is reasonably tolerant to changes in the design structure caused by fabrication errors. In addition, the design contains key features to enable and aid the fabrication process. The very different material properties of the metallic base layer, compared to the dielectric top surface, not only causes beneficial optical effects, but also could be used as a stop layer in the fabrication process. This means that the etching chemistry of the dielectric multilayer could be chosen so that the metallic base layer is essentially unaffected. The base layer would then act as a stop layer, allowing more precise etching of the grating grooves.

An example fabrication method is as follows:

1. Deposit gold, silica and silicon as single layers on top of the desired substrate.
2. Coat the top silicon surface with photoresist.
3. Expose the photoresist and develop as normal.
4. Etch the exposed regions with a $CHF_3$ reactive gas chemistry. The Gold layer acts as a stop layer.
5. Remove the photoresist with an $O_2$ plasma clean.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A grating, comprising:
   a base layer comprising material that reflects electromagnetic radiation, wherein said base layer comprises metal; and
   layers of dielectric material of varying refractive index, wherein a bottom interface of said layers is adherent to said base layer, wherein said layers are periodically spaced on top of said base layer, wherein said base layer is not covered by said layers in regions, wherein said grating comprises at least one Bragg plane.

2. The grating of claim 1, further comprising a polished substrate, wherein said base layer is a coating adherent to said polished substrate.

3. The grating of claim 1, wherein each layer of said layers comprises approximately a quarter-wave of optical thickness at a desired angle of incidence relative to said grating.

4. The grating of claim 1, wherein each layer of said layers comprises approximately a quarter-wave of optical thickness at one of the Bragg angles (grating orders) of said grating.

5. The grating of claim 1, wherein each layer of said layers comprises approximately a half-wave of optical thickness at a desired angle of incidence relative to said grating.

6. The grating of claim 1, wherein each layer of said layers comprises approximately a half-wave of optical thickness at one the Bragg angles (grating orders) of said grating.

7. The grating of claim 1, wherein each layer of said layers has an arbitrary thickness such that combined layers have an optical thickness that gives high reflected diffraction efficiency for the angle of incidence and wavelength used and acts as an angular filter to attenuate light in one of the unwanted diffraction orders.

8. The grating of claim 1, wherein said dielectric material is selected from the group consisting of Silica, Silicon Hafnia, Scandia and, Tantalum Pentoxide.

9. The grating of claim 1, wherein said layers are configured to act as an anti-reflection layer for one of the Bragg angles of said grating.

10. The grating of claim 1, wherein said layers are configured to act as a high reflector for one of the Bragg angles of the grating.

11. A grating, comprising:
    a base layer comprising material that reflects electromagnetic radiation; and
    layers of dielectric material of varying refractive index, wherein a bottom interface of said layers is adherent to said base layer, wherein said layers are periodically spaced on toy of said base layer, wherein said base layer is not covered by said layers in regions wherein said grating comprises at least one Bragg plane, wherein said base layer comprises a metal blank having a polished surface.

12. A grating, comprising:
    a base layer comprising material that reflects electromagnetic radiation, and
    layers of dielectric material of varying refractive index, wherein a bottom interface of said layers is adherent to said base layer, wherein said layers are periodically spaced on top of said base layer, wherein said base layer is not covered by said layers in regions, wherein said grating comprises at least one Bragg plane, wherein said layers have a protective layer of about a half-wave thickness for one of the Bragg planes of the grating.

13. A method for fabricating a grating, comprising:
    providing a base layer comprising material that reflects electromagnetic radiation, wherein said base layer comprises metal; and
    adhering layers of dielectric material of varying refractive index, wherein a bottom interface of said layers is adherent to said base layer, wherein said layers are periodically spaced on top of said base layer, wherein said base layer is not covered by said layers in regions, wherein said grating comprises at least one Bragg plane.

14. The method of claim 13, further comprising providing a polished substrate and adhering said base layer to said polished substrate.

15. The method of claim 13, wherein each layer of said layers comprises approximately a quarter-wave of optical thickness at a desired angle of incidence relative to said grating.

16. The method of claim 13, wherein each layer of said layers comprises approximately a quarter-wave of optical thickness at one of the Bragg angles (grating orders) of said grating.

17. The method of claim 13, wherein each layer of said layers comprises approximately a half-wave of optical thickness at a desired angle of incidence relative to said grating.

18. The method of claim 13, wherein each layer of said layers comprises approximately a half-wave of optical thickness at one the Bragg angles (grating orders) of said grating.

19. The method of claim 13, wherein each layer of said layers has an arbitrary thickness such that combined layers have an optical thickness that gives high reflected diffraction efficiency for the angle of incidence and wavelength used and acts as an angular filter to attenuate light in one of the unwanted diffraction orders.

20. The method of claim 13, wherein said dielectric material is selected from the group consisting of Silica, Silicon, Hafnia, Scandia and Tantalum Pentoxide.

21. The method of claim 13, wherein said layers are configured to act as an anti-reflection layer for one of the Bragg angles of said grating.

22. The method of claim 13, wherein said layers are configured to act as a high reflector for one of the Bragg angles of the grating.

23. A method for fabricating a grating, comprising:
providing a base layer comprising material that reflects electromagnetic radiation; and
adhering layers of dielectric material of varying refractive index, wherein a bottom interface of said layers is adherent to said base layer, wherein said layers are periodically spaced on top of said base layer, wherein said base layer is not covered by said layers in regions, wherein said grating comprises at least one Bragg plane, wherein said base layer comprises a metal blank having a polished surface.

24. A method for fabricating a grating, comprising:
providing a base layer comprising material that reflects electromagnetic radiation; and
adhering layers of dielectric material of varying refractive index, wherein a bottom interface of said layers is adherent to said base layer, wherein said layers are periodically spaced on toy of said base layer, wherein said base layer is not covered by said layers in regions, wherein said grating comprises at least one Brags plane, wherein said layers have a protective layer of about a half-wave thickness for one of the Bragg planes of the grating.

* * * * *